United States Patent
Chung et al.

(10) Patent No.: US 9,808,855 B2
(45) Date of Patent: Nov. 7, 2017

(54) RIVET MODULE AND JOINING STRUCTURE AND METHOD USING THE SAME

(71) Applicant: SUNGWOO HITECH CO., LTD., Busan (KR)

(72) Inventors: Yun Sung Chung, Busan (KR); Mun Yong Lee, Busan (KR)

(73) Assignee: SUNGWOO HITECH CO., LTD., Busan (KR)

( * ) Notice: Subject to any disclaimer, the term of this patent is extended or adjusted under 35 U.S.C. 154(b) by 207 days.

(21) Appl. No.: 14/524,039

(22) Filed: Oct. 27, 2014

(65) Prior Publication Data

US 2016/0084290 A1 Mar. 24, 2016

(30) Foreign Application Priority Data

Sep. 18, 2014 (KR) .......................... 10-2014-0124566

(51) Int. Cl.
*F16B 35/06* (2006.01)
*B21J 15/02* (2006.01)
(Continued)

(52) U.S. Cl.
CPC ............ *B21J 15/02* (2013.01); *B21J 15/027* (2013.01); *B21J 15/043* (2013.01); *B21J 15/147* (2013.01);
(Continued)

(58) Field of Classification Search
CPC ...... F16B 19/08; F16B 19/083; F16B 19/086; F16B 19/10; F16B 19/1027; F16B 19/1036; F16B 19/1045; F16B 19/1054; F16B 19/1072; F16B 39/023; B21J 15/02; B21J 15/025; B21J 15/027; B21J 15/04; B21J 15/041; B21J 15/043; B21J 15/045; B21J 15/048; B21J 15/147; Y10T 29/49954; Y10T 29/49956; Y10T 29/49833
(Continued)

(56) References Cited

U.S. PATENT DOCUMENTS 2,408,559 A * 10/1946 Keating .............. F16B 19/1054
411/17
2,659,255 A * 11/1953 Bates .................... B25B 15/001
29/432
(Continued)

FOREIGN PATENT DOCUMENTS

CH WO 2015017942 A1 * 2/2015 ............ B21J 15/025
DE 102011009602 A1 * 3/2012 ............ F16B 19/086
(Continued)

*Primary Examiner* — John C Hong
(74) *Attorney, Agent, or Firm* — Lex IP Meister, PLLC (57) ABSTRACT

A rivet module is provided to join at least two sheets of base materials in a solid state, the rivet module including: i) a shank portion to be mounted on a reciprocal and rotatable joining tool; ii) a base material friction portion that is integrally connected to the shank portion and drills through the base materials as the joining tool causes the base material friction portion to be rotated while applying pressure to the base materials; and iii) a base material fastening portion that is fixedly fitted to the shank portion, supports the base material friction portion, and is fastened to the base materials through a thread formed on the outer peripheral surface thereof.

8 Claims, 8 Drawing Sheets

(51) Int. Cl.
*F16B 19/08* (2006.01)
*F16B 19/10* (2006.01)
*B21J 15/04* (2006.01)
*B21J 15/14* (2006.01)

(52) U.S. Cl.
CPC ........ *F16B 19/083* (2013.01); *F16B 19/1054* (2013.01)

(58) Field of Classification Search
USPC .......................................... 411/29, 325, 271
See application file for complete search history.

(56) References Cited

U.S. PATENT DOCUMENTS

| | | | | |
|---|---|---|---|---|
| 2,705,030 | A * | 3/1955 | Koffler | B25B 15/001 29/26 R |
| 3,289,290 | A * | 12/1966 | Sandor | B25B 21/007 192/34 |
| 4,408,938 | A * | 10/1983 | Maguire | F16B 13/126 411/181 |
| 4,507,817 | A * | 4/1985 | Staffeld | B23B 51/08 29/432 |
| 4,589,178 | A * | 5/1986 | Staffeld | B23B 51/08 29/240 |
| 4,990,042 | A * | 2/1991 | Szayer | F16B 19/1054 411/29 |
| 5,915,901 | A * | 6/1999 | Aasgaard | B29C 65/602 411/107 |
| 6,796,759 | B2 * | 9/2004 | Aasgaard | B21J 15/048 408/224 |
| 6,862,864 | B2 * | 3/2005 | O'Banion | B21J 15/025 29/525.03 |
| 7,654,781 | B2 * | 2/2010 | McDuff | F16B 13/061 411/30 |
| 8,740,527 | B2 * | 6/2014 | Cheng | F16B 13/061 411/29 |
| 9,140,286 | B2 * | 9/2015 | Dent | F16B 5/02 |
| 2003/0009958 | A1 * | 1/2003 | O'Banion | B21J 15/025 52/127.1 |
| 2006/0067803 | A1 * | 3/2006 | Hsu | F16B 13/003 411/29 |
| 2006/0228188 | A1 * | 10/2006 | Hsu | F16B 13/003 411/29 |
| 2008/0008554 | A1 * | 1/2008 | Lu | F16B 13/003 411/29 |
| 2016/0084290 | A1 * | 3/2016 | Chung | B21J 15/02 29/525.06 |

FOREIGN PATENT DOCUMENTS

| | | |
|---|---|---|
| JP | 06-001818 | 1/1994 |
| JP | 2004-525316 | 8/2004 |
| JP | 2005-226807 | 8/2005 |
| JP | 2009-526180 | 7/2009 |
| KR | 10-1990-0001992 | 2/1990 |
| KR | 10-2009-0045946 | 5/2009 |

* cited by examiner

RIVET MODULE AND JOINING STRUCTURE AND METHOD USING THE SAME

CROSS-REFERENCE TO RELATED APPLICATION

This application claims priority to and the benefit of Korean Patent Application No. 10-2014-0124566 filed in the Korean Intellectual Property Office on Sep. 18, 2014, the entire contents of which are incorporated herein by reference.

BACKGROUND OF THE INVENTION (a) Field of the Invention

An exemplary embodiment of the present invention relates to a fastener element, and more particularly, to a rivet module for mechanically joining two or more sheets of base materials and a joining structure and method using the same.

(b) Description of the Related Art

In general, methods of forming a variety of structures by joining a plurality of base materials, for example, metal or non-metal plates, sheets, and randomly-shaped objects involve mechanically joining overlapping base materials by fastener elements such as bolts, nuts, rivets, etc.

Among them, the mechanical joining method using a rivet allows the fastening of base materials by making a hole in target base materials, inserting a rivet in the hole, and plastically deforming the rivet.

However, this joining method using a rivet requires an additional process of drilling a hole in the base materials, which may degrade productivity and workability.

To address this problem, those in the art have drifted toward the simple method of joining a plurality of base materials by a fastener element called an FDS (Flow Drill Screw). This fastener element is also referred to as a friction stir rivet.

In one example, an FDS rivet-type fastener element includes a head portion mounted on a pressure/rotation device, a screw portion integral with the head portion and having a thread on the outer peripheral surface, and a drilling portion integrally connected to the screw portion and for drilling through a base material.

Accordingly, in the joining method using the above-described fastener element, when the head portion is mounted on a pressure/rotation device and rotated under pressure by the pressure/rotation device, with the drilling portion being in contact with overlapping base materials, a hole is formed in the base materials by the friction between the drilling portion and the base materials and the base materials are fastened with the screw portion. Thus, the base materials are joined together.

Even with a joining structure obtained by joining base materials with such a fastener element, however, the quality of external appearance of joined products may be low because the screw portion and the drilling portion stick out from the base materials, and the joint strength of the base materials may be low because the base materials are joined in a solid state simply with the screw portion.

The above information disclosed in this section is only for enhancement of understanding of the background of the invention and therefore it may contain information that does not form the prior art that is already known in this country to a person of ordinary skill in the art.

SUMMARY OF THE INVENTION

The present invention has been made in an effort to provide a rivet module which increases joint strength of base materials and improves quality of external appearance of joined products by screwing the base materials together through a hole drilled in them and at the same time using a blind rivet, and a joining structure and method using the same.

An exemplary embodiment of the present invention provides a rivet module for joining at least two sheets of base materials in a solid state, the rivet module including: i) a shank portion to be mounted on a reciprocal and rotatable joining tool; ii) a base material friction portion that is integrally connected to the shank portion and drills through the base materials as the joining tool causes the base material friction portion to be rotated while applying pressure to the base materials; and iii) a base material fastening portion that is fixedly fitted to the shank portion, supports the base material friction portion, and is fastened to the base materials through a thread formed on the outer peripheral surface thereof.

In the rivet module according to the exemplary embodiment of the present invention, the shank portion may be broken off from the base material friction portion.

In the rivet module according to the exemplary embodiment of the present invention, the shank portion may have a non-circular cross-section and couple with the base material fastening portion through mating connection.

In the rivet module according to the exemplary embodiment of the present invention, the shank portion may have a polygonal cross-section and be rounded on the edges.

In the rivet module according to the exemplary embodiment of the present invention, the part of the base material friction portion connected to the shank portion may have a larger cross-sectional area than the shank portion, and the base material friction portion may be integrally connected to the shank portion.

In the rivet module according to the exemplary embodiment of the present invention, the circular cross-sectional diameter of the base material friction portion may becomes gradually larger and then smaller from the part connected to the shank portion toward the tip, and the tip may be sharpened.

In the rivet module according to the exemplary embodiment of the present invention, the base material fastening portion may have a hollow space into which the shank portion and the base material friction portion are fitted.

In the rivet module according to the exemplary embodiment of the present invention, the hollow space may include: a first portion having a shape corresponding to the cross-section of the shank portion; and a second portion connected to the first portion and having a shape corresponding to the region where the cross-sectional diameter of the base material friction portion becomes gradually larger.

In the rivet module according to the exemplary embodiment of the present invention, the shank portion may be fitted to the first portion through the second portion of the base material fastening portion.

In the rivet module according to the exemplary embodiment of the present invention, the base material friction portion may be fitted to the second portion.

In the rivet module according to the exemplary embodiment of the present invention, a flange-shaped head supporting the joining tool may be formed on one end of the base material fastening portion.

In the rivet module according to the exemplary embodiment of the present invention, a drilling guide that penetrates into the base materials may be formed on the other end of the base material fastening portion which corresponds to the second portion.

In the rivet module according to the exemplary embodiment of the present invention, the drilling guide may be formed in a tapered shape, by which the cross-sectional diameter becomes gradually smaller.

In the rivet module according to the exemplary embodiment of the present invention, the thread may be formed between the head and the drilling guide on the outer peripheral surface of the base material fastening portion.

In the rivet module according to the exemplary embodiment of the present invention, the base material friction portion may be pulled upward by the joining tool and enter the first portion.

In the rivet module according to the exemplary embodiment of the present invention, the base material fastening portion may be plastically deformed by the base material friction portion, causing the cross-section to expand outward.

Another exemplary embodiment of the present invention provides a joining structure using the rivet module, which includes a shank portion, a base material friction portion, and a base material fastening portion and joins at least two sheets of base materials in a solid state, wherein the base material fastening portion with a hollow space is screwed to the base materials by a thread formed on the outer peripheral surface, penetrating the base materials, and the base material friction portion is arranged within the hollow space of the base material fastening portion, while the base material fastening portion is plastically deformed by the base material friction portion, causing the cross-section to expand outward.

In the joining structure using the rivet module according to the exemplary embodiment of the present invention, the base material fastening portion may include: a flange-shaped head formed on one end and supporting one side of the base materials; and a drilling guide formed on the other end and protruding to the other side of the base materials while penetrating the base materials.

In the joining structure using the rivet module according to the exemplary embodiment of the present invention, the circular cross-sectional diameter of the base material friction portion may become gradually larger and then smaller from the head of the base material fastening portion toward the drilling guide, and the tip of the base material friction portion may be sharpened.

In the joining structure using the rivet module according to the exemplary embodiment of the present invention, the base material friction portion may be exposed to the head through the hollow space of the base material fastening portion, and a breaking mark of the shank portion may be formed in the exposed region.

Yet another exemplary embodiment of the present invention provides a joining method using the rivet module including a shank portion, a base material friction portion, and a base material fastening portion, the method including: fixedly mounting the shank portion on a joining tool; moving the rivet module to two or more sheets of overlapping base materials and drilling through the base materials by the base material friction portion by applying pressure on and rotating the rivet module while supporting the base material fastening portion through the joining tool; screwing the base material fastening portion to the base materials through the hole drilled by the base material fastening portion; causing the base material friction portion to enter the base material fastening portion by pulling the shank portion through the joining tool, and causing the cross-section of the base material fastening portion to expand outward by means of the base material friction portion; and breaking off the shank portion from the base material friction portion.

In the joining method using the rivet module according to the exemplary embodiment of the present invention, a hole may be drilled in the base materials by the friction of the base material friction portion, the base material fastening portion may be screwed to the base materials, and the cross-section of the base material fastening portion may expand using a blind rivet.

In the joining method using the rivet module according to the exemplary embodiment of the present invention, the rivet may be rotated under pressure through the joining tool, and the base material fastening portion may be inserted into the hole.

In the joining method using the rivet module according to the exemplary embodiment of the present invention, the base material fastening portion and the base materials may be screwed together through a thread formed on the outer peripheral surface of the base material fastening portion.

According to an embodiment of the present invention, two or more sheets of base materials are joined together by drilling through the base materials by the friction of the base material friction portion on the base materials, screwing the base material fastening portion to the base materials, and causing the cross-section of the base material fastening portion to expand using a blind rivet by means of the base material friction portion.

Accordingly, in the embodiment of the present invention, the joint strength of the base materials can be further increased because two or more sheets of base materials are joined by screwing the base materials through a hole drilled in them by friction and plastically deforming the fastener elements of the base materials using a blind rivet.

Furthermore, in the embodiment of the present invention, only the drilling guide of the base material fastening portion penetrates the base materials and protrudes toward the lowermost surfaces of the base materials. This further improves the quality of external appearance of joined products, unlike the prior art methods in which the screw portion and the drilling portion stick out from the base materials.

BRIEF DESCRIPTION OF THE DRAWINGS

The drawings are provided for reference to explain an illustrative embodiment of the present invention, and the technical spirit of the present disclosure should not be interpreted to be limited to the accompanying drawings.

DETAILED DESCRIPTION OF THE EMBODIMENTS

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

To clearly describe the present disclosure, parts that are irrelevant to the description are omitted. Like numerals refer to like or similar constituent elements throughout the specification.

The size and the thickness of each component illustrated in the drawings are arbitrarily illustrated for better understanding and ease of description, but the present disclosure is not limited to the illustration. In the drawings, the thicknesses of various portions and regions are enlarged for clarity.

Further, in the following detailed description, names of constituents, which are in the same relationship, are divided into "the first", "the second", and the like, but the present disclosure is not limited to the order in the following description.

In the specification, unless explicitly described to the contrary, the word "comprise" and variations such as "comprises" or "comprising" will be understood to imply the inclusion of stated elements but not the exclusion of any other elements.

In addition, the terms such as " . . . unit", " . . . means", " . . . part", etc., which are disclosed in the specification, refer to a unit of an inclusive constituent which performs at least one function or operation.

Figure 1:
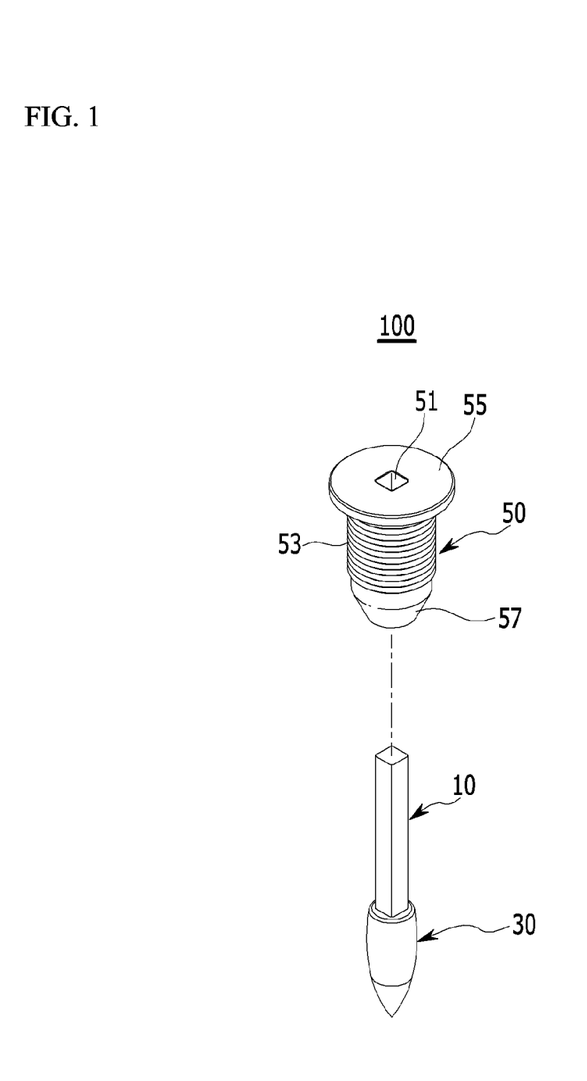
FIG. 1 is an exploded perspective view showing a rivet module according to an exemplary embodiment of the present invention.
Figure 2:
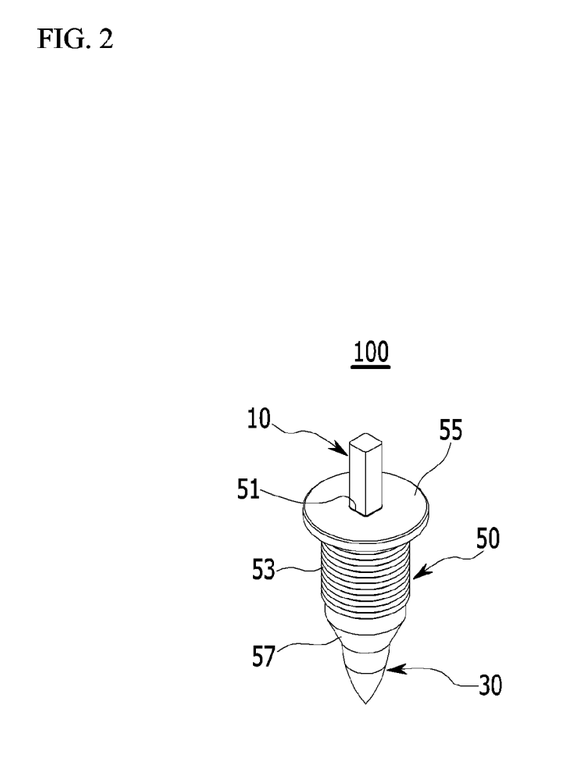
FIG. 2 is an assembled perspective view showing the rivet module according to the exemplary embodiment of the present invention.
Figure 3:
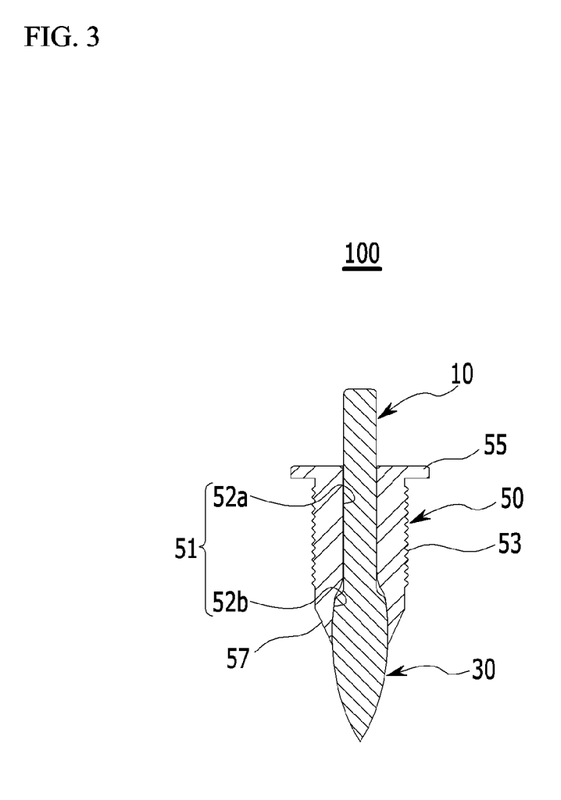
FIG. 3 is a cross-sectional view showing the rivet module according to the exemplary embodiment of the present invention.

FIG. 1 is an exploded perspective view showing a rivet module according to an exemplary embodiment of the present invention, FIG. 2 is an assembled perspective view of FIG. 1, and FIG. 3 is a cross-sectional view of FIG. 2.

Referring to FIGS. 1 to 3, the rivet module 100 according to the exemplary embodiment of the present invention may apply to a vehicle body assembly process in which two or more sheets of overlapping base materials 1 (hereinafter, refer to FIG. 4), for example, vehicle body panels, are joined together.

However, the base materials 1 are not necessarily limited to vehicle body panels, but may include a variety of vehicle body structures such as vehicle body members, frames, etc.

Furthermore, the scope of protection of this invention should not be construed as limited to assembly of vehicle bodies, and the technical spirit of this invention can apply to any structures of various types and purposes as long as they are made by assembling components.

The base materials 1 may include metal sheet materials such as aluminum sheets or steel sheets (including high-tensile steel sheets), and nonmetal materials such as composites, plastics, or rubber. Moreover, the base materials 1 may include plates made of the same material or plates made of different materials.

The rivet module 100 according to the exemplary embodiment of the present invention is for joining two or more sheets of overlapping base materials 1 in a solid state by a mechanical joining method such as friction stir processing or plastic deformation.

The following components will now be described when the rivet module 100 is viewed in a vertical direction while being erected. A part facing upward is defined as a top part or an upper part, and a part facing downward is defined as a bottom part or a lower part.

However, the terms may be defined by relatively meanings. The rivet module 100 may be viewed in a different direction depending on the reference position of the rivet module and the direction in which the base materials 1 are joined. Therefore, the reference direction of this exemplary embodiment is not necessarily limited to the above direction.

In the exemplary embodiment of the present invention, the rivet module 100 includes a joining tool 200 (hereinafter, refer to FIG. 4) for mechanically joining the base materials 1 in solid state using the rivet module 100.

The joining tool 200 can clamp the rivet module 100 according to the exemplary embodiment of the present invention, and can vertically move and rotate the rivet module 100.

The rivet module 100 according to the exemplary embodiment of the present invention to be described hereinafter has a structure that increases the joint strength of the base materials 1 and improves the quality of external appearance of joined products by screwing the base materials 1 through a hole drilled in them by friction, and at the same time plastically deforming the fastener elements of the base materials 1 using a blind rivet.

To this end, the rivet module 100 according to the exemplary embodiment of the present invention basically includes a shank portion 10, a base material friction portion 30, and a base material fastening portion 50.

In the exemplary embodiment of the present invention, the shank portion 10, which is a rod of a given length, is fixedly mounted on the aforementioned joining tool 200.

The shank portion 10 may have a non-circular cross-section, and is coupled with the base material fastening portion 50, which is to be described in further detail, through mating connection. For example, the shank portion 10 may have a polygonal (e.g., rectangular) cross-section and may be rounded at the edges.

The shank portion 10 has a non-circular, polygonal cross-section so that the base material fastening portion 50 to be described later in further detail is fixed to the shank portion 10 and the shank portion 10 rotates together with the base material fastening portion 50 by the joining tool 200.

In the exemplary embodiment of the present invention, the base material friction portion 30 is for drilling through the base materials 1 by friction caused by pressure and torque applied from the joining tool 200 through the shank portion 10. That is, the base material friction portion 30 is able to drill through the base materials 1 as the joining tool 200 causes the base material friction portion 30 to be rotated while applying pressure to the base materials 1.

Referring to the drawings, the base material friction portion 30 is integrally connected to the bottom part of the shank portion 10. The part of the base material friction portion 30 connected to the bottom part of the shank portion 10 may have a larger cross-sectional area than the shank portion 10, and the base material friction portion 30 may be integrally connected to the shank portion 10.

For example, the base material friction portion 30 may be configured in such a manner that its circular cross-sectional diameter becomes gradually larger and then smaller from the part (the top in the figures) connected to the shank portion 10 toward the tip (the bottom in the figures), and the tip is sharpened.

That is, the base material friction portion 30 has a bullet shape, and forms a convex surface between the part connected to the shank portion 10 and the sharpened tip.

Since the part of the base material friction portion 30 connected to the bottom part of the shank portion 10 has a larger cross-sectional area than the shank portion 10, the shank portion 10 may be broken off from the base material friction portion 30 by external force.

In the exemplary embodiment of the present invention, the base material fastening portion 50 is for substantially joining the base materials 1 through the hole drilled in the base materials 1 by the base material friction portion 30.

The base material fastening portion 50 has a structure that is fixedly fitted to the shank portion 10, supported on the base material friction portion 30, and screwed to the base materials 1 through the hole in the base materials 1.

Specifically, the base material fastening portion 50 has a hollow space 51 into which the shank portion 10 and the base material friction portion 30 are partially fitted. A thread 53 to be screwed to the base materials 1 through the hole in the base materials 1 is formed on the outer peripheral surface of the base material fastening portion 50.

A flange-shaped head 55 supporting the joining tool 200 and the uppermost surfaces of the base materials 1 is formed on one end (the top part in the figures) of the base material fastening portion 50.

The hollow space 51 of the base material fastening portion 50 includes a first portion 52a having a shape corresponding to the cross-section of the shank portion 10 and a second portion 52b connected to the first portion 52a and having a shape corresponding to the region where the cross-sectional diameter of the base material friction portion 30 becomes gradually larger.

In this case, the first portion 52a is the part where the shank portion 10 is fitted through the second portion 52b, and the second portion 52b is the part where one part (which gradually increases in cross-sectional diameter) of the base material friction portion 30 is fitted.

That is, the shank portion 10 may be fitted to the first portion 52a through the second portion 52b from the underside of the base material fastening portion 50, and one part of the base material friction portion 30 may be fitted to the second portion 52b.

A drilling guide 57 is formed on the other end (the bottom part in the figures) of the base material fastening portion 50 to penetrate into the base materials 1 through the hole drilled in the base materials 1 by means of the base material friction portion 30.

The drilling guide 57 may be formed in a tapered shape, by which the cross-section diameter becomes gradually smaller from the top to the bottom, corresponding to the second portion 52b.

The drilling guide 57 is formed in the base material fastening portion 50 in order to allow the base material fastening portion 50 to easily penetrate through the hole drilled in the base materials 1.

In this case, the aforementioned thread 53 may be formed between the head 55 and the drilling guide 57 on the outer peripheral surface of the base material fastening portion 50.

On the other hand, in the exemplary embodiment of the present invention, the base material friction portion 30 may be pulled upward by the joining tool 200 and enter the first portion 52a from the second portion 52b of the base material fastening portion 50.

Accordingly, the base material fastening portion 50 may be plastically deformed by the base material friction portion 30 and expand outward from the hollow space 51 because the cross-sectional area of the shank portion 10 fitted to the first portion 52a is smaller than the cross-sectional area of the base material friction portion 30.

Now, a method of joining materials using the thus-configured rivet module 100 according to the exemplary embodiment of the present invention will be described in detail with reference to the previously disclosed drawings and the accompanying drawings.

FIGS. 4 to 7 are views showing a joining method using a rivet module according to an exemplary embodiment of the present invention.

Referring to FIGS. 4 to 7, in the exemplary embodiment of the present invention, the base materials 1 can be joined using the aforementioned joining tool 200 in such a manner that the base materials 1 are screwed together through a hole drilled in them by the rivet module 100, and at the same time the fastener elements of the base materials 1 are plastically deformed using a blind rivet.

The joining tool 200 includes a mount portion 101 for clamping the shank portion 10 of the rivet module 100 and a drive portion 103 for rotating the mount portion 101 while vertically reciprocating the mount portion 101.

The joining tool 200 of this type is configured as a component of a friction stir system as is well known to those skilled in the art, so further detailed description of this component will be omitted in this specification.

Figure 4:
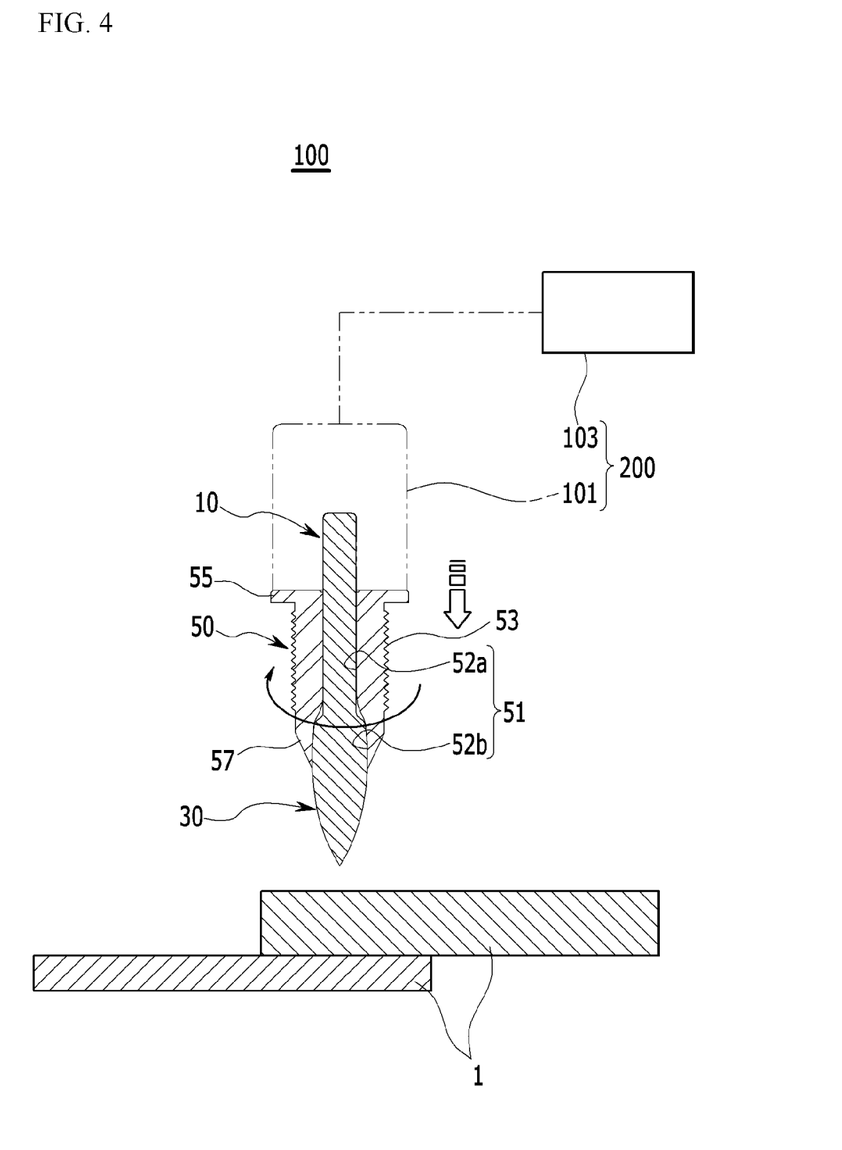
FIGS. 4 to 7 are views showing a joining method using a rivet module according to an exemplary embodiment of the present invention.

An example of joining the base materials 1 using the joining tool 200 will now be described. First of all, according to the exemplary embodiment of the present invention, the shank portion 10 of the rivet module 100 is mounted on the mount portion 101 of the joining tool 200, as shown in FIG. 4.

Hereupon, the base material fastening portion 50 is fixedly fitted to the shank portion 10 and supported on the base material friction portion 30, and the head 55 of the base material fastening portion 50 is supported on the mount portion 101.

That is, the shank portion 10 is fitted to the first portion 52a through the second portion 52b of the base material fastening portion 50 on the underside of the base material fastening portion 50, and one part of the base material fastening portion 30 is fitted to the second portion 52b.

Figure 5:
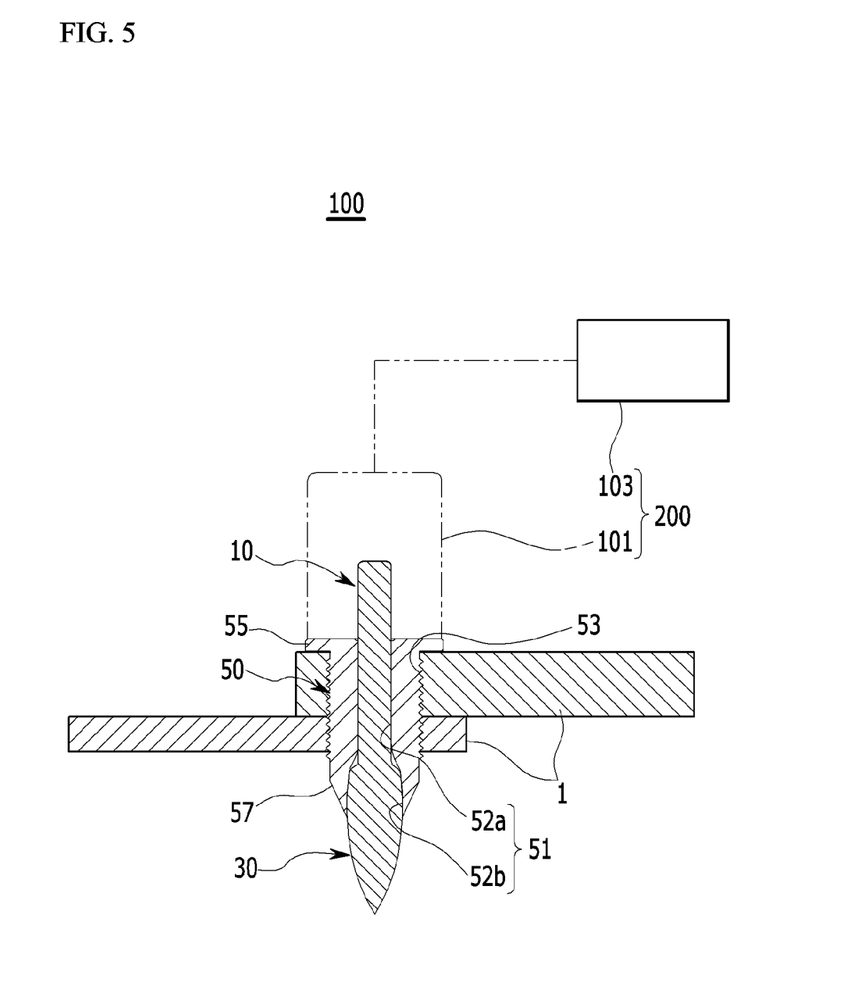

With this configuration, in the exemplary embodiment of the present invention, as shown in FIG. 5, the rivet module 100 is moved to two or more sheets of overlapping base materials 1 through the drive portion 103 of the joining tool 200, the base material friction portion 30 of the rivet module 100 applies pressure on the base materials 1, and the drive portion 103 of the joining tool 200 rotates the rivet module 100.

Then, the base material friction portion 30 drills through the base materials 1 by the friction caused by the pressure and torque applied from the drive portion 103 of the joining tool 200 through the shank portion 10.

With the hole is drilled in the base materials 1 through the base material friction portion 30, the rivet module 100 is continuously rotated under pressure according to the exemplary embodiment of the present invention.

Hereupon, the base material fastening portion 50 of the rivet module 100 is applying pressure to the base materials 1 while rotating together with the shank portion by the pressure and torque applied from the drive portion 103 of the joining tool 200 through the shank portion 10.

Accordingly, the drilling guide 57 of the base material fastening portion 50 penetrates into the base materials 1 through the hole drilled in the base materials 1 by the base material friction portion 30, and protrudes toward the lowermost surfaces of the base materials 1.

The base material fastening portion 50 is screwed to the base materials 1 by the thread 53 formed on the outer peripheral surface, and the head 55 of the base material fastening portion 50 supports the uppermost surfaces of the base materials 1.

Figure 6:
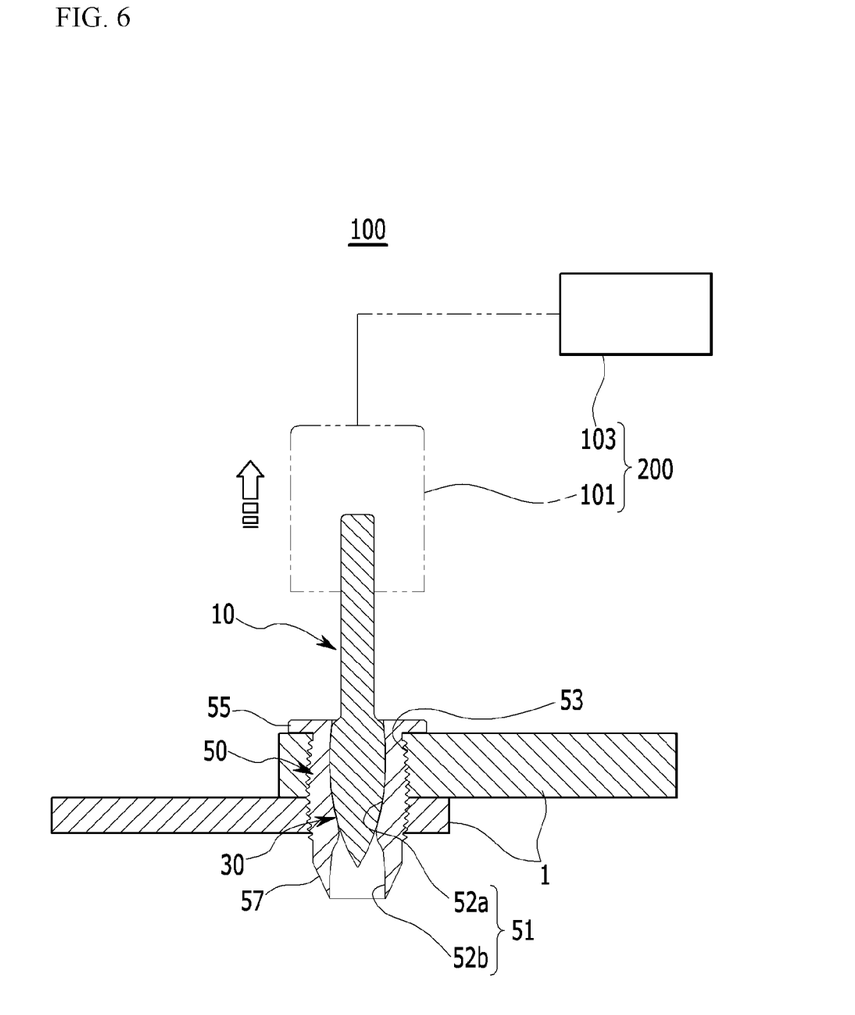

With the base materials 1 being fastened by the base material fastening portion 50 as described above, according to the exemplary embodiment of the present invention, the shank portion 10 is pulled by the drive portion 103 of the joining tool 200, as shown in FIG. 6.

Then, the shank portion 10 is drawn out of the first portion 52a of the base material fastening portion 50, and the base material friction portion 30 enters the first portion 52a while causing the second portion 52b of the base material fastening portion 50 to plastically deform the first portion 52a.

Accordingly, the base material fastening portion 50 may be plastically deformed by the base material friction portion 30 and expand outward from the hollow space 51 because the cross-sectional area of the shank portion 10 fitted to the first portion 52a is smaller than the cross-sectional area of the base material friction portion 30.

Therefore, in the exemplary embodiment of the present invention, as the cross-section of the base material fastening portion 50 expands outward from the hollow space 51 through the base material friction portion 30, the joint strength of the base materials 1 can be further increased because of the expanded cross-section of the base material fastening portion 50.

Figure 7:
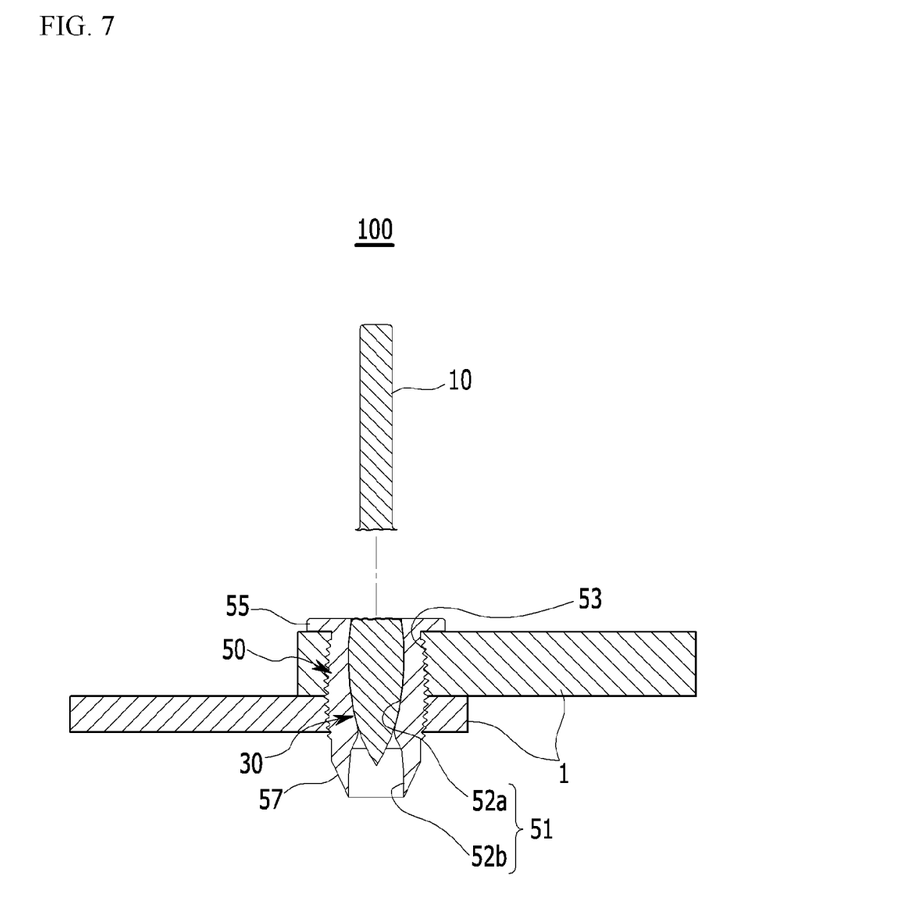

Afterwards, in the exemplary embodiment of the present invention, the mount portion 101 of the joining tool 200 is removed from the shank portion 10, and as shown in FIG. 7, the shank portion 10, drawn out of the first portion 52a of the base material fastening portion 50, is hit by a predetermined striking mechanism to break off the shank portion 10 from the base material friction portion 30.

Accordingly, in the exemplary embodiment of the present invention, the assembling of a joining structure 300, obtained by joining the base materials 1 together using the rivet module 100 through a series of processes as described above, is completed (see FIG. 8).

Figure 8:
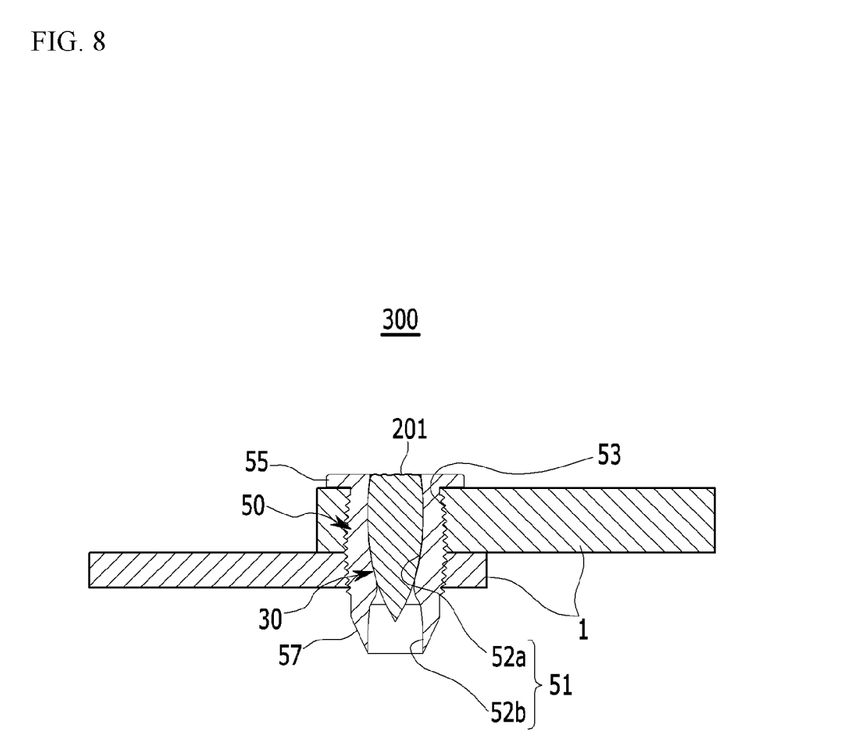
FIG. 8 is a view showing a joining structure using a rivet module according to an exemplary embodiment of the present invention.

FIG. 8 is a view showing a joining structure using a rivet module according to an exemplary embodiment of the present invention.

Referring to FIG. 8, the joining structure 300 using the rivet module 100 according to the exemplary embodiment of the present invention is basically configured in such a manner that the base material fastening portion 50 with the hollow space 51 is screwed to two or more sheets of overlapping base materials 1 by the thread 53 formed on the outer peripheral surface, penetrating the base materials 1.

Moreover, the joining structure 300 according to the exemplary embodiment of the present invention is configured in such a manner that the base material friction portion 30 is arranged within the hollow space 51 of the base material fastening portion 50 and the cross-section of the base material fastening portion 50 expands outward from the hollow space 51 by plastic deformation caused by the base material friction portion 30.

The head 55 of the base material fastening portion 50 supports the uppermost surfaces of the base materials 1. The drilling guide 57 of the base material fastening portion 50 penetrates the base materials 1 and protrudes toward the lowermost surfaces of the base materials 1.

In the exemplary embodiment of the present invention, the circular cross-sectional diameter of the base material friction portion 30 becomes gradually larger and then smaller from the head 55 of the base material fastening portion 50 toward the drilling guide 57, and the tip of the base material friction portion 30 is sharpened.

In this case, the base material friction portion 30 is exposed to the head 55 through the hollow space 51 of the base material fastening portion 50, and a breaking mark 201 of the shank portion 10 is formed in the exposed region.

According to the rivet module 100 and the joining structure 300 and method using the same according to the exemplary embodiment of the present invention as explained hitherto, two or more sheets of base materials 1 can be joined together by drilling through the base materials 1 by the friction of the base material friction portion 30 on the base materials 1, screwing the base material fastening portion 50 to the base materials 1, and causing the cross-section of the base material fastening portion 50 to expand using a blind rivet by means of the base material friction portion 30.

Therefore, in the exemplary embodiment of the present invention, two or more sheets of base materials 1 are joined by screwing the base materials 1 through a hole drilled in them by friction and plastically deforming the fastener elements of the base materials 1 using a blind rivet, thereby further increasing the joint strength of the base materials 1.

Furthermore, in the exemplary embodiment of the present invention, only the drilling guide 57 of the base material fastening portion 50 penetrates the base materials 1 and protrudes toward the lowermost surfaces of the base materials 1. This further improves the quality of external appearance of joined products, unlike the prior art methods in which the screw portion and the drilling portion stick out from the base materials.

Although the exemplary embodiments of the present invention have been described above, the present invention is not limited to those embodiments. It may be modified in various forms without departing from the scope of the claims, the detailed description, and the accompanying drawings of the present invention. Therefore, it is natural that such modifications are within the scope of the present invention.

| <Description of symbols> | |
|---|---|
| 1 | base material |
| 10 | shank portion |
| 30 | base material friction portion |
| 50 | base material fastening portion |
| 51 | hollow space |
| 52a | first portion |
| 52b | second portion |
| 53 | thread |
| 55 | head |
| 57 | drilling guide |
| 100 | rivet module |
| 101 | mount portion |
| 103 | drive portion |
| 200 | joining tool |
| 201 | breaking mark |
| 300 | joining structure |

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A rivet module for joining at least two sheets of base materials in a solid state, the rivet module comprising:
   i) a shank portion to be mounted on a reciprocal and rotatable joining tool;
   ii) a base material friction portion that is integrally connected to the shank portion and drills through the base materials as the joining tool causes the base material friction portion to be rotated while applying pressure to the base materials; and iii) a base material fastening portion that is fixedly fitted to the shank portion, supports the base material friction portion, and is fastened to the base materials through a threaded portion including a thread formed on an outer peripheral surface thereof so that the threaded portion is disposed within the base materials, wherein a circular cross-sectional diameter of the base material friction portion becomes progressively larger and then smaller from a part connected to the shank portion toward a tip, and the tip is sharpened, wherein the base material fastening portion has a hollow space into which the shank portion and the base material friction portion are fitted, wherein the hollow space comprises:

a first portion having a shape corresponding to a cross-section of the shank portion; and a second portion connected to the first portion and having a shape corresponding to a region where the cross-sectional diameter of the base material friction portion becomes progressively larger, wherein the base material friction portion is pulled upward by the joining tool and enters the first portion, and wherein the threaded portion of the base material fastening portion is plastically deformed by the base material friction portion, causing a cross-section of the threaded portion to expand outward.

2. The rivet module of claim 1, wherein the shank portion is broken off from the base material friction portion.

3. The rivet module of claim 2, wherein the shank portion has a non-circular cross-section and couples with the base material fastening portion through mating connection.

4. The rivet module of claim 3, wherein the shank portion has a polygonal cross-section and is rounded on the edges.

5. The rivet module of claim 2, wherein the part of the base material friction portion connected to the shank portion has a larger cross-sectional area than the shank portion, and the base material friction portion is integrally connected to the shank portion.

6. The rivet module of claim 1, wherein the shank portion is fitted to the first portion through the second portion of the base material fastening portion, and the base material friction portion is fitted to the second portion.

7. The rivet module of claim 1, wherein a flange-shaped head supporting the joining tool is formed on one end of the base material fastening portion, and a drilling guide that penetrates into the base materials is formed on the other end of the base material fastening portion which corresponds to the second portion.

8. The rivet module of claim 7, wherein the drilling guide is formed in a tapered shape, by which the cross-sectional diameter becomes progressively smaller, and the thread is formed between the head and the drilling guide on the outer peripheral surface of the base material fastening portion.

\* \* \* \* \*